United States Patent [19]

Tetrick

[11] Patent Number: 6,003,112
[45] Date of Patent: Dec. 14, 1999

[54] MEMORY CONTROLLER AND METHOD FOR CLEARING OR COPYING MEMORY UTILIZING REGISTER FILES TO STORE ADDRESS INFORMATION

[75] Inventor: Raymond S. Tetrick, Portland, Oreg.

[73] Assignee: Intel Corporation, Santa Clara, Calif.

[21] Appl. No.: 08/886,079

[22] Filed: Jun. 30, 1997

[51] Int. Cl.⁶ .................................................. G06F 13/00
[52] U.S. Cl. ........................ 711/100; 711/165; 711/166
[58] Field of Search .................... 711/165, 166, 711/135, 5, 100, 154; 365/230.03

[56] References Cited

U.S. PATENT DOCUMENTS

| | | | |
|---|---|---|---|
| 5,303,354 | 4/1994 | Higuchi et al. | 711/165 |
| 5,524,226 | 6/1996 | Arioka et al. | 711/5 |
| 5,561,818 | 10/1996 | Kawasaki | 711/100 |
| 5,634,034 | 5/1997 | Foster | 711/147 |
| 5,657,476 | 8/1997 | O'Connell et al. | 711/166 |
| 5,761,444 | 6/1998 | Ajanovic et al. | 710/100 |
| 5,848,284 | 12/1998 | Sharangpani | 395/800.01 |

OTHER PUBLICATIONS

Intel 3865X Microprocessor Programmer's Reference Manual, 1991, pp. 2–7 to 3–2, 17–118, 17–145, 17–173, 17–174, E1–E2.

*Primary Examiner*—Glenn Gossage
*Attorney, Agent, or Firm*—Blakely, Sokoloff, Taylor & Zafman LLP

[57] ABSTRACT

A memory controller and method for clearing and copying memory in a computer system. The memory controller includes a register file having fields that store information that defines a first block of memory and indicates whether the first block of memory is to be cleared or copied to a first destination, and a first resource unit that clears or copies the first block of memory to the first destination as indicated by the first register file. The register file may store the starting address and length or size of the first block of memory, or a starting and ending address of the first block of memory. The name of the operation to be performed by the first resource unit may also be stored in the register file. A clearing operation may be performed by invalidating cache data that corresponds to the block of memory and writing zeros into the block of memory. A second register file and resource unit may also be provided and a second block of memory cleared or copied simultaneously with the first block of memory.

24 Claims, 5 Drawing Sheets

MEMORY CONTROLLER AND METHOD FOR CLEARING OR COPYING MEMORY UTILIZING REGISTER FILES TO STORE ADDRESS INFORMATION

FIELD OF THE INVENTION

The present invention relates to the management of memories in computer systems. More specifically, the present invention relates to memory controllers in computer systems.

BACKGROUND OF THE INVENTION

Memory clearing is an operation performed frequently by both firmware and operating system software. Firmware clears memory as part of the power-up self-testing done by the Basic Input Output System (BIOS) in today's personal computers. Operating systems clear pages of memory for applications that request memory. Typically, the operating system allocates a physical address or a location in memory to the application. The operating system clears the location in memory to put the location in a constant state before returning a pointer to the location. The clearing of memory is currently performed by executing code in the processor that results in zeros being written into the memory.

Memory-to-memory copy is another operation performed frequently by operating system software. Memory-to-memory copies are performed when a data structure at a first location in memory is copied to a second location in memory. Typically, when a copy is requested, the operating system allocates a physical address or a second location in memory to copy the data structure. The data structure is read and written into the second location in memory. Operating systems utilize the processor to complete these functions by executing code in the processor.

The clearing of memory and copying of memory through the execution of code in the processor consumes processor time that could otherwise be used to execute application code. When a plurality of memory requests are made that require large blocks of memory to be cleared or when a plurality of copying requests are made, the processor is prevented from executing application code for a significant amount of time. This adversely affects the overall performance of the computer system in running applications. In addition, cache memory within the processors have historically made this clearing and copying of memory particularly problematic in computer systems.

SUMMARY

A memory controller according to one embodiment of the present invention includes a resource allocating unit, a register file, and a number of resource units. The register file has fields to store information. The information that can be stored in the register file defines a block of memory locations in a memory. One of the resource units can clear the block of memory locations defined by the register file by writing predetermined data to the memory locations. The resource allocating unit indicates which of the resource units are available at a particular instant in time.

In another embodiment, the register file has fields to store information that defines a block of memory locations and a destination of where to copy the contents of the block of memory locations. In which case, one of the resource units can copy the contents of the block of memory locations to the destination as defined by the register file.

DESCRIPTION OF THE DRAWINGS

The present invention is illustrated by way of example and not by way of limitation in the figures of the accompanying drawings in which like references indicate similar elements and in which.

DETAILED DESCRIPTION

Figure 1:
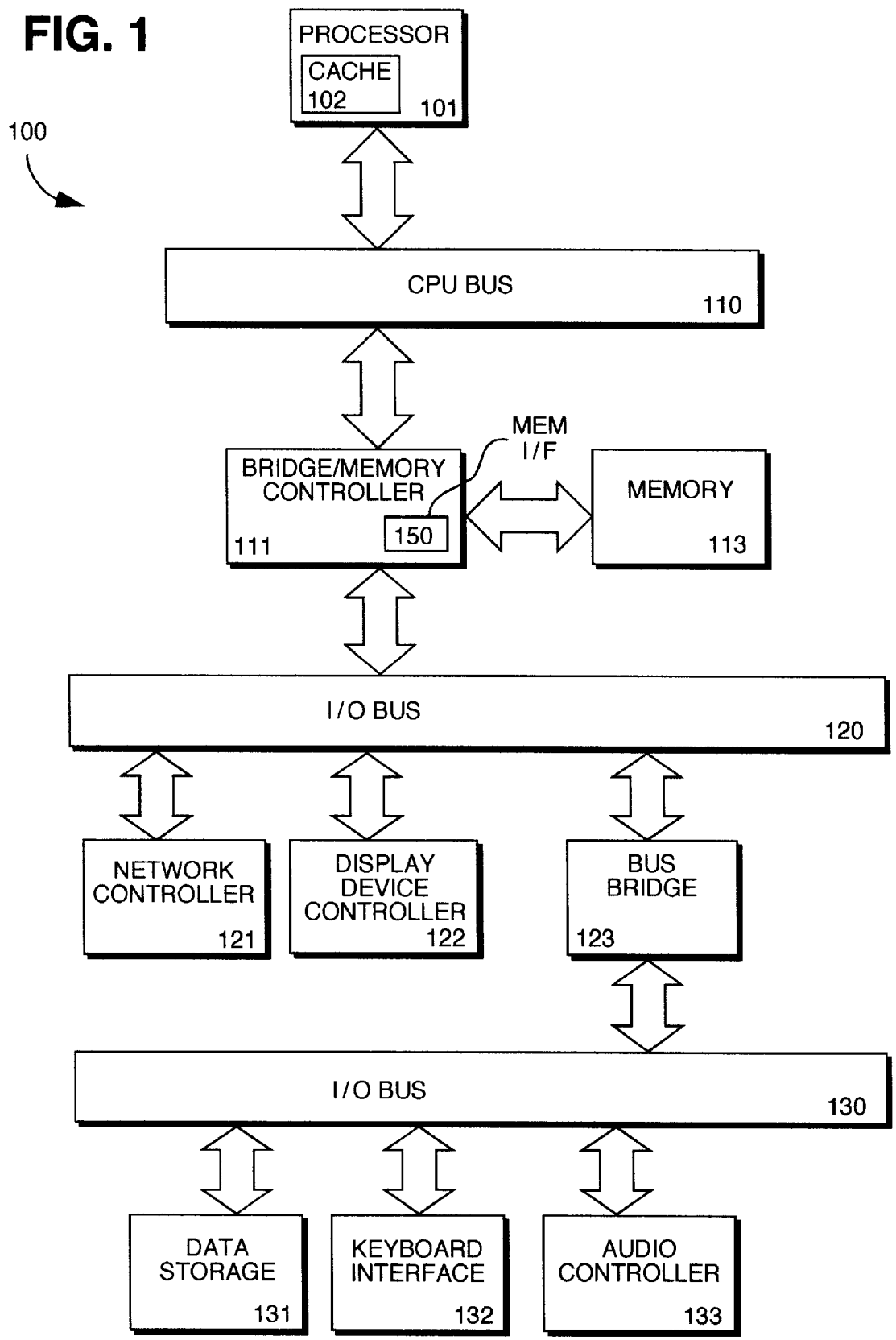
FIG. 1 is a block diagram illustrating an embodiment of a computer system according to the present invention.

Referring to FIG. 1, a computer system upon which an embodiment of the present invention may be implemented is shown as 100. The computer system 100 includes a processor 101 that processes digital data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 which transmits signals between processor 101 and other components in the computer system 100.

As an example, memory 113 may be a dynamic random access memory (DRAM) device, a static random access memory (SRAM) device, or other memory device. The memory 113 stores information or other intermediate data signals that are executed by the processor 101. A cache memory 102 resides inside processor 101 that stores information or other intermediate data that is stored in memory 113. According to an embodiment of the cache 102, the cache 102 is a write-back cache. The cache 102 speeds up memory accesses by the processor 101 by taking advantage of its locality of access. In an alternate embodiment of the computer system 100, the cache 102 resides external to the processor 101. A bridge memory controller 111 is coupled to the CPU bus 110 and the memory 113. The bridge memory controller 111 directs data signals between the processor 101, the memory 113, and other components in the computer system 100 and bridges signals from these components to a high speed input/output (I/O) bus 120.

The bridge memory controller 111 includes a memory interface 150. The memory interface 150 operates to perform operations on the memory 113 that might otherwise be performed by the execution of code in the processor 101. By performing operations that were typically performed through the execution of code in the processor 101, the memory interface 150 frees up CPU time in the processor 101 for executing application code. The memory interface 150 increases parallelism in the computer system 100 by allowing operations to be performed on the memory 113 independent of the processor 101. According to one embodiment of the present invention, the memory interface 150 operates to clear the memory 113 when a memory request is made. According to a second embodiment of the present invention, the memory interface 150 operates to copy a data structure from a first location in the memory 113 to a second location in the memory 113 when a memory-to-memory copy is requested. According to a third embodiment of the present invention, the memory interface 150 operates to both clear and copy memory. It should be appreciated that the memory interface 150 may reside outside of the bridge memory controller 111.

The high speed I/O bus 120 supports peripherals operating at high data throughput rates. The high speed I/O bus 120 may be a single bus or a combination of multiple buses. As an example, the high speed I/O bus 120 may comprise a Peripheral Component Interconnect (PCI) bus, a Personal Computer Memory Card International Association (PCMCIA) bus or other buses. The high speed I/O bus 120 provides communication links between components in the computer system 100. A network controller 121 links a network of computers together and provides communication among the machines. A display device controller 122 is coupled to the high speed I/O bus 120. The display device controller 122 allows coupling of a display device to the computer system 100 and acts as an interface between the display device and the computer system 100. The display device controller may be a monochrome display adapter (MDA) card, a color graphics adapter (CGA) card, an enhanced graphics adapter (EGA) card, an extended graphics array (XGA) card or other display device controller.

The display device may be a television set, a computer monitor, a flat panel display or other display device. The display device receives data signals from the processor 101 through the display device controller 122 and displays the data signals to the user of the computer system 100.

An I/O bus 130 is used for communicating information between peripheral devices that operate at lower throughput rates. The I/O bus 130 may comprise a single bus or a combination of multiple buses. As an example, the I/O bus 130 may comprise an Industry Standard Architecture (ISA) bus, an Extended Industry Standard Architecture (EISA) bus or a Micro Channel Architecture (MCA) bus. The I/O bus 130 provides communication links between components in the computer system 100. A keyboard interface 132 may comprise a keyboard controller or other keyboard interface. The keyboard interface 132 may comprise a dedicated device or may reside in another device such as a bus controller or other controller. The keyboard interface 132 allows coupling of a keyboard to the computer system 100 and transmits signals from a keyboard to the computer system 100. A data storage device 131 may comprise a hard disk drive, a floppy disk drive, a CD-ROM device, a flash memory device or other mass storage device. An audio controller 133 operates to coordinate the recording and playing of sounds is also coupled to the I/O bus 130. A bus bridge 123 couples the high speed I/O bus 120 to the I/O bus 130. The bus bridge 123 comprises a translator to bridge signals between the high speed I/O bus 120 and the I/O bus 130.

Figure 2:
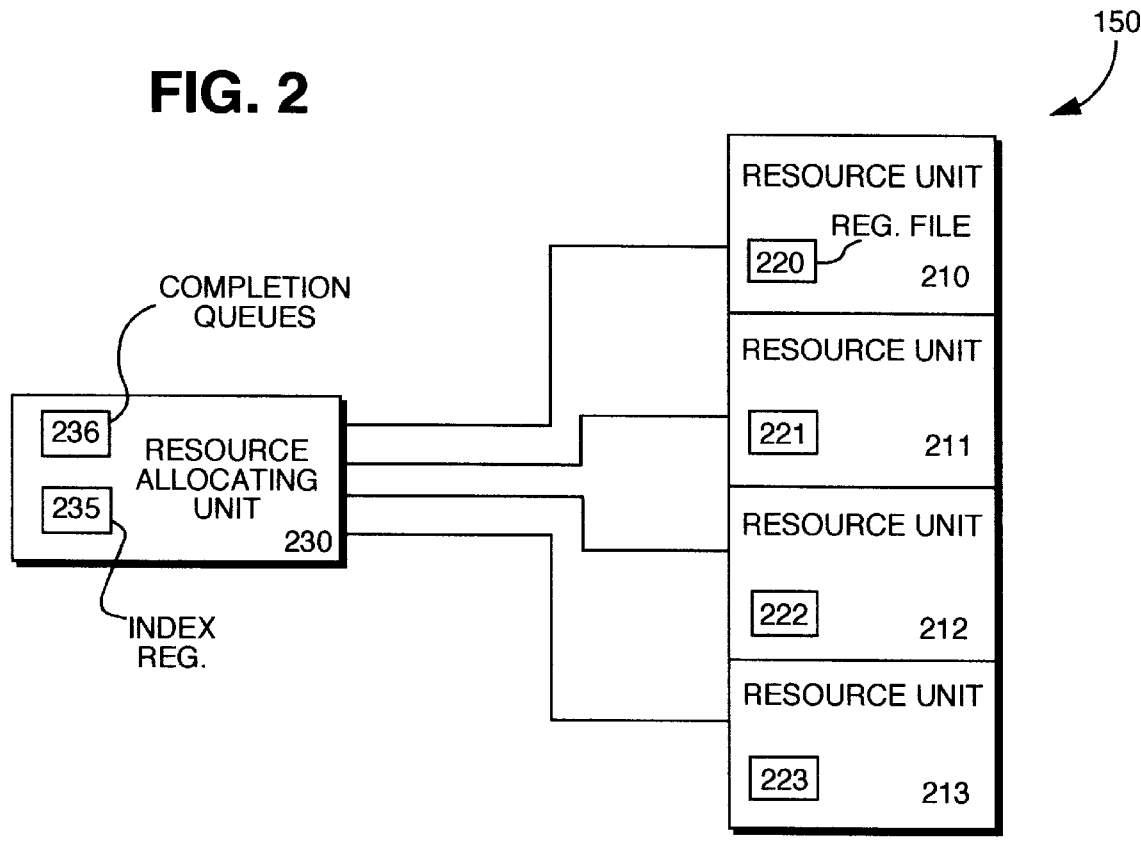
FIG. 2 is a block diagram illustrating a first embodiment of a memory interface according to the present invention.

FIG. 2 is a block diagram of a memory interface according to a first embodiment of the present invention. Memory interface 150 operates to clear a block of memory in the memory 113 (shown in FIG. 1). Memory interface 150 includes a plurality of resource units 210–213. Each of the resource units 210–213 has a Corresponding register file 220–223. Each of the resource units 210–213 also has a corresponding numerical index value which may be used to identify each of the resource units 210–213. A resource allocating unit 230 is coupled to each of the resource units 210–213.

The resource allocating unit 230 monitors the activities of each of the resource units 210–213. The resource allocating unit 230 includes an index register 235. The resource allocating unit 230 writes an index value in the index register 235 of a resource unit that is available. When none of the resource units 210–213 are available, the resource allocating unit 230 writes a predefined value in the index register 235 that is understood by the operating system to mean all of the resource units 210–213 are unavailable. The operating system reads the index register 235 of the resource allocating unit 230 and uses the information in the index register 235 to either assign a resource unit to perform a memory clear operation in the case where a resource unit is available, or waits to re-read the index register 235 in the case where a resource unit is unavailable.

According to an embodiment of the present invention, the resource allocating unit 230 automatically updates the status of the index register 235 after it has been read by the operating system and when the availability of a resource unit changes. According to an alternate embodiment of the present invention, the resource allocating unit 230 updates the status of the index register 235 after the operating system has attempted to read the index register 235. The index register 235 allows arbitration and allocation of the resource units 210–213 without the use of semaphores. The time required to obtain access to dedicated hardware through negotiation using semaphores have the disadvantage of requiring a large amount of time. The index register 235 provides an extensible, non-blocking solution that overcomes the disadvantages associated with the use of semaphores.

The resource allocating unit 230 also includes completion queues 236. Completion queues 236 include an individual queue (not shown) corresponding to each of the resource units 210–213. The completion queues 236 operate to indicate whether a resource unit has finished updating the status of cache data in the processor 101 (shown in FIG. 1) in response to a request to clear a location in the memory 113.

Figure 3:
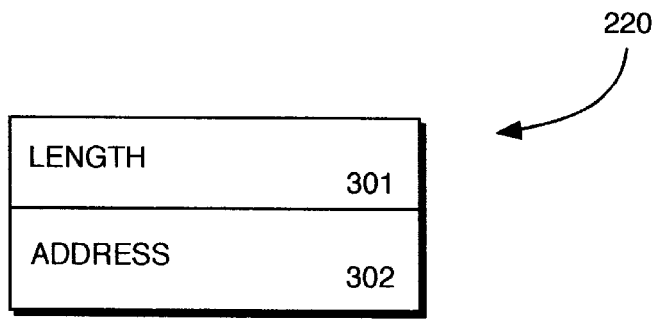
FIG. 3 is a block diagram illustrating a first embodiment of a register file according to the present invention.

The register files 220–223 are used by the resource units 210–213 to store information regarding locations in memory that are to be cleared. Upon receiving information regarding the identity of a resource unit that is available, the operating system writes information regarding a location in memory that is to be cleared in a register file corresponding to the resource unit. FIG. 3 illustrates a register file according to one embodiment of the present invention. The register file 220 includes an address field 302 that stores a starting address of a block of memory to be cleared. The register file 220 also includes a length field 301 that stores the size of the block of memory to be cleared. According to an alternate embodiment of the register file 220, the register file includes an address field that stores a starting address of the block of memory to be cleared and an ending address of the block of memory to be cleared. It should be appreciated that the register file 220 may be utilized to record the location of memory to be cleared using any known technique.

The resource units 210–213 operate to update the status of the cache data in the processor 101 (shown in FIG. 1) corresponding to locations in memory defined by information in their register files 220–223. The status of the cache data is updated to reflect that the processor no longer has a current copy of the contents in its cache. The resource unit assigned the memory clear operation conducts MEMORY INVALIDATE cycles beginning at the starting address written in its register file. Cycles are run at each cache line boundary. In an alternate embodiment of the memory interface 150, MEMORY READ cycles are conducted by the resource unit in the case where the CPU bus 110 (shown in FIG. 1) does not allow MEMORY INVALIDATE cycles. In this embodiment, write-back data is ignored. After the status of the cache data has been updated, the completion queue corresponding to the resource unit is updated to indicate that the updating operation has been completed. It should be appreciated that the resource unit assigned the memory clear operation may clear the defined block of memory using any known technique.

The resource units 210–213 also operate to conduct memory write operations to clear the requested memory locations by writing zeros to locations in memory defined by information in their register files 220–223. Any read cycles that occur to the addressed range before the memory operations have been completed are immediately returned as zero by the memory interface 150. No memory cycles are conducted in response to these read requests. Any write cycles that occur to the addressed range before the memory operations have been completed are queued by the memory interface 150. These operations could also result in a DEFERRED cycle, where the memory interface 150 responds with completion status at a later time.

FIG. 2 shows the memory interface 150 having four resource units 210–213. It should be appreciated that the memory interface 150 may implement any number of resource units where a plurality of operations may be performed on the memory 113 simultaneously by the memory interface 150 when a plurality of resource units are implemented. FIG. 2 also shows the register files 220–223 to be inside resource units 210–213 in FIG. 2. It should be appreciated, however, that the register files 220–223 may be implemented outside and coupled to their corresponding resource units 210–213. The resource units 210–213, the register files 220–223, and the resource allocating unit 230 may be implemented by any known circuitry. According to one embodiment of the present invention the resource units 210–213, the register files 220–223, and the resource allocating unit 230 all reside on a single semiconductor substrate.

Figure 4:
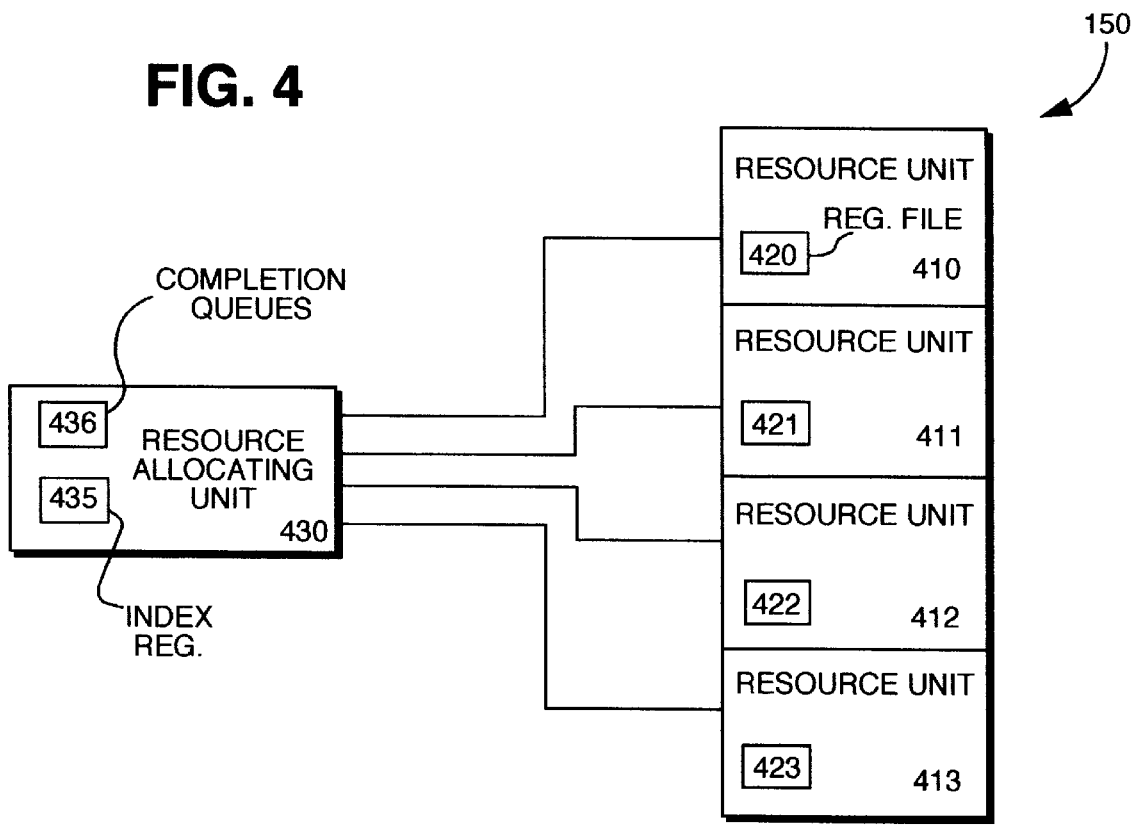
FIG. 4 is a block diagram illustrating a second embodiment of a memory interface according to the present invention.

FIG. 4 is a block diagram of a memory interface according to a second embodiment of the present invention. Memory interface 150 operates to copy a data structure at a first location in the memory 113 (shown in FIG. 1) to a second location in the memory 113. Memory interface 150 includes a plurality of resource units 410–413. Each of the resource units 410–413 has a corresponding register file 420–423. A resource allocating unit 430 is coupled to each of the resource units 410–413.

The resource allocating unit 430 operates similarly to the resource allocating unit 230 (shown in FIG. 2). The resource allocating unit also includes an index register 435 and completion queues 436 which operate similarly to the index register 235 and the completion queues 236 (shown in FIG. 2).

The register files 420–423 are used by the resource units 410–413 to store information regarding a data structure at a first location in the memory 113 and a second location in the memory 113 where the data structure is to be copied. Upon receiving information regarding the identity of a resource unit that is available, the operating system writes information regarding the data structure at the first location in memory 113 and the second location in memory 113 where the data is to be copied in a register file corresponding to the resource unit.

Figure 5:
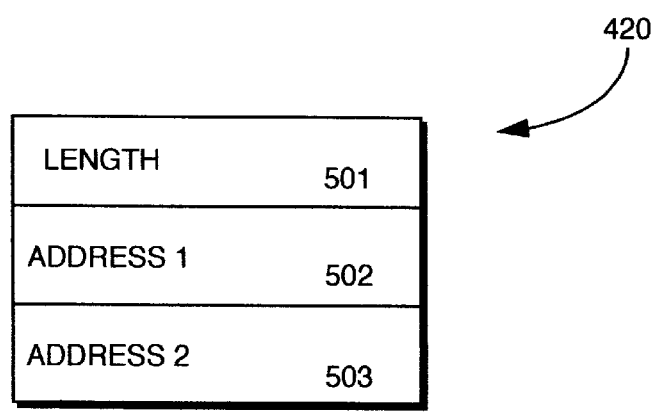
FIG. 5 is a block diagram illustrating a second embodiment of a register file according to the present invention.

FIG. 5 illustrates a register file according to one embodiment of the present invention. The register file 420 includes a first address field 502 that stores a starting address of the block of memory containing the data structure. The register file 420 includes a length field 501 that stores the size of the block of memory that contains the data structure. The register file 420 also contains a second address field 503 that stores a destination address of where the data structure is to be copied. According to an alternate embodiment of the register file 420, the register file includes a first address field that stores a starting address of the block of memory that contains the data structure, a second address field that stores an ending address of the block of memory that contains the data structure, and a third address field that stores the destination address of where the data structure is to be copied. It should be appreciated that the register file 420 may be utilized to record the location of the data structure and the destination address of where the data structure is to be copied using any known technique.

The resource units 410–413 operate to read the data structure in the first locations in memory 113 defined by information in their register files 420–423. The resource unit assigned the memory copy operation conducts READ FOR OWNERSHIP cycles beginning at the starting address written in its register file. If write-back data is returned in response to the READ FOR OWNERSHIP cycle, the data is treated just as a normal write-back. The bridge memory controller 111 converts the read operation into a memory write and alters the memory 113. When the entire data structure has been read, the completion queue corresponding to the resource unit is updated to indicate that the reading operation has been completed. Should the processor 101 attempt to read the completion status, the read is DEFERRED until all READ FOR OWNERSHIP cycles have been completed. It should be appreciated that the resource unit assigned the memory copy operation can copy the data structure at the first location in memory to the second location in memory using any known techniques.

The resource units 410–413 also operate to copy the data structure at the starting address to the destination address stored in their register files 420–423. Read cycles that occur to the destination address range before the memory operations have been completed have the address converted to the corresponding address in the starting address range. Any write cycles that occur to the second location in memory before the memory operations have been completed are DEFERRED and are queued by the memory interface 150.

Figure 6:
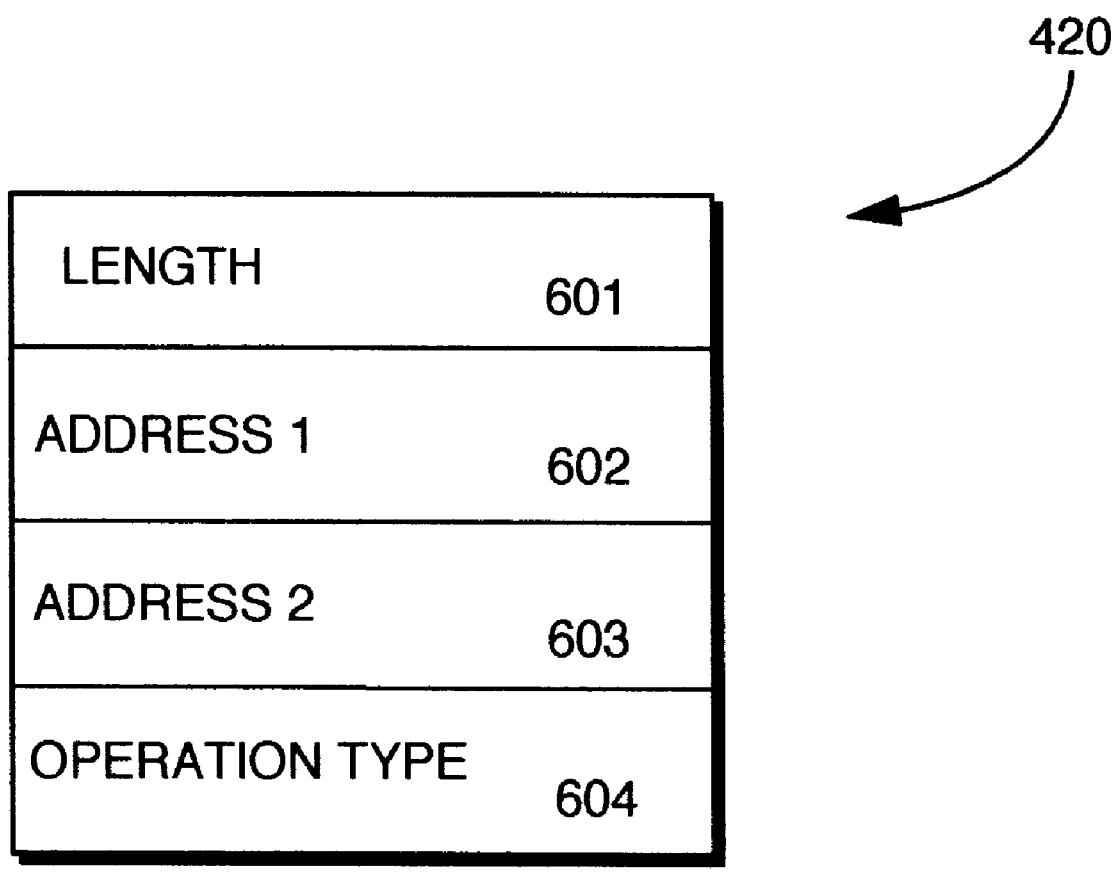
FIG. 6 is a block diagram illustrating a third embodiment of a register file according to the present invention.

According to a third embodiment of the memory interface 150, the resource units 410–413 include the memory clearing circuitry in resource units 210–213 (shown in FIG. 2) and operate to clear or copy locations in memory as directed by the operating system. FIG. 6 shows a block diagram of an embodiment of a register file of a resource unit according to this third embodiment. Register file 420 includes an operation type field 604 that stores information written by the operating system indicating whether its corresponding resource unit is to perform a memory clear operation or a memory copy operation. A length field 601 and a first address field 602 are used to store information relating to a block of memory to clear when a memory clear operation is to be performed by the resource unit. The length field 601 and the first address field 602 are used to store information relating to a block of memory to copy and the second address field 603 is used to store information relating to the destination in memory of where to copy the block of memory when a copy operation is to be performed by the resource unit.

FIG. 4 shows the memory interface 150 having four resource units 410–413. It should be appreciated that the memory interface 150 may implement any number of resource units where a plurality of operations may be performed on the memory 113 simultaneously by the memory interface 150 when a plurality of resource units are implemented. FIG. 4 also shows the register files 420–423 to be inside resource units 410–413 in FIG. 4. It should be appreciated, however, that the register files 420–423 may be implemented outside and coupled to their corresponding resource units 410–413. The resource units 410–413, the register files 420–423, and the resource allocating unit 430 may be implemented by any known circuitry. According to one embodiment of the present invention the resource units 410–413, the register files 420–423, and the resource allocating unit 430 all reside on a single semiconductor substrate.

Figure 7:
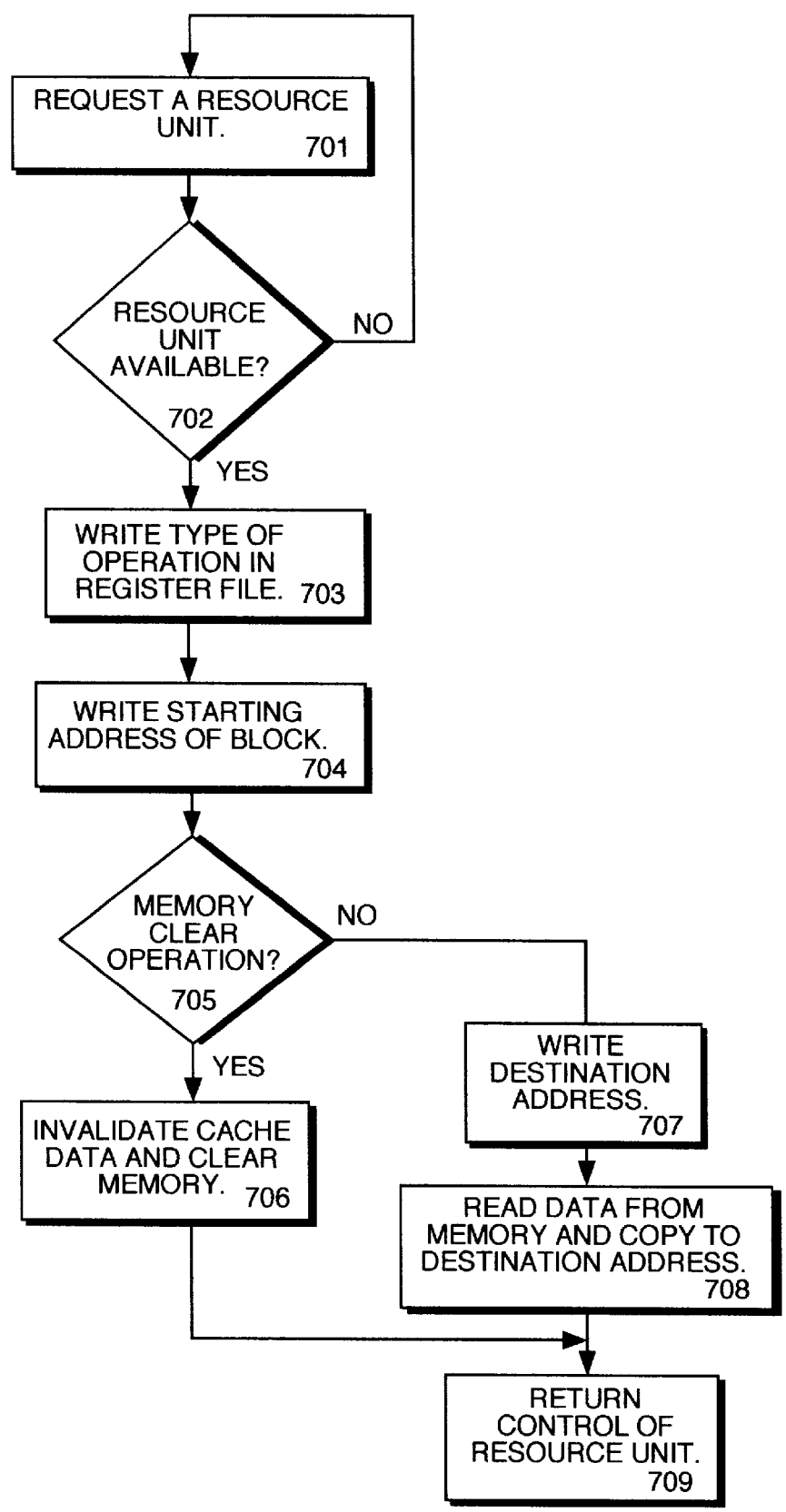
FIG. 7 is a flow chart illustrating a method of clearing and copying memory according to an embodiment of the present invention.

FIG. 7 is a flow chart illustrating a method of clearing and copying memory according to an embodiment of the present invention. At 701, the operating system requests a resource unit from a memory interface in a bridge memory controller to perform an operation on the memory. According to an embodiment of the present invention, the memory interface writes an index of a resource unit that is available in an index register.

At 702, if a resource unit is available, proceed to 703. If a resource unit is not available, return to 701.

At 703, the operating system writes the name of the type of operation to be performed on the memory in a register file corresponding to the resource unit. According to an embodiment of the present invention, the name of the operation is written in an operation type field in the register file.

At 704, the operating system writes the starting address of the block of memory in the memory to which the operation is to be performed in the register file. According to an embodiment of the present invention, the starting address is written in a first address field in the register file.

At 705, if the name of the operation is a memory clear operation, proceed to 706, if the name of the operation is not a memory clear operation, proceed to 707.

At 706, the resource unit invalidates cache data in a processor that corresponds to the memory. The resource unit also writes zeros into the block of memory. According to an embodiment of the present invention, cache data is invalidated by issuing a MEMORY INVALIDATE command. According to an alternate embodiment of the present invention, cache data is cleared by issuing a MEMORY READ command.

At 707, the operating system writes the destination address of where the block of memory is to be copied in the register file. According to an embodiment of the present invention, the destination address is written in a second address field in the register file.

At 708, the resource unit reads data from the block of memory. The resource unit also copies the data to the destination address. According to an embodiment of the present invention, data is read from the block of memory by making a READ FOR OWNERSHIP command.

At 709, control of the resource unit is returned to the memory interface.

In the foregoing description, the invention is described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

I claim:

1. A memory controller comprising:

a resource allocating unit coupled to a plurality of resource units, the resource allocating unit to indicate which of the plurality of resource units are available at a particular instant in time;

a first register file comprising fields to store information that defines a first block of memory locations in a memory; and a first resource unit of the plurality of resource units, coupled to the first register file, to clear the first block of memory locations as defined in the first register file by writing predetermined data to the first block of memory locations.

2. The memory controller of claim 1, wherein the resource allocating unit comprises an index register to store an indicator that indicates which of the plurality of resource units are available.

3. The memory controller of claim 1, wherein the first register file comprises:

an address field to store a starting address of the first block of memory locations; and a length field to store a size of the first block of memory locations.

4. The memory controller of claim 1, wherein the first register file comprises an address field to store a starting address and an ending address of the first block of memory locations.

5. The memory controller of claim 1, further comprising:

a second register file comprising fields to store information that defines a second block of memory locations in the memory; and a second resource unit of the plurality of resource units, coupled to the second register file, to clear the second block of memory locations as defined by the second register file simultaneously as the first resource unit clears the first block of memory locations.

6. A memory controller comprising:

a resource allocating unit coupled to a plurality of resource units the resource allocating unit to indicate which of the plurality of resource units are available at a particular instant in time;

a first register file comprising fields to store information that defines a first block of memory locations in a memory and a first destination of where to copy contents of the first block of memory locations; and a first resource unit of the plurality of resource units, coupled to the first register file, to copy the contents of the first block of memory locations to the first destination as defined in the first register file.

7. The memory controller of claim 6, wherein the memory controller comprises an index register to store an indicator that indicates which of the plurality of resource units are available.

8. The memory controller of claim 6, wherein the first register file comprises:

an address field to store a starting address of the first block of memory locations and a destination address of where to copy the contents of the first block of memory locations; and a length field to store a size of the first block of memory locations.

9. The memory controller of claim 6, wherein the first register file comprises an address field to store a starting address and an ending address of the first block of memory locations and a destination address of where to copy the contents of the first block of memory locations.

10. The memory controller of claim 6, further comprising:
a second register file comprising fields to store information that defines a second block of memory locations in the memory and a second destination of where to copy contents of the second block of memory locations; and
a second resource unit of the plurality of resource units, coupled to the second register file, to copy the contents of the second block of memory locations as defined by the second register file to the second destination simultaneously as the first resource unit copies the contents of the first block of memory locations.

11. A memory controller comprising:
a first register file comprising fields to store information that defines a first block of memory locations in a memory and indicates whether the first block of memory locations is to be cleared or whether contents of the first block of memory locations are to be copied to a first destination; and
a first resource unit, coupled to the first register file, to clear the first block of memory locations or copy the contents of the first block of memory locations to the first destination as indicated by the first register file.

12. The memory controller of claim 11, further comprising an index register coupled to the first resource unit, the index register to store an indicator that indicates whether the first resource unit is available.

13. The memory controller of claim 11, wherein the first register file comprises:
an operation field to store a name of an operation to be performed by the first resource unit;
an address field to store a starting address of the first block of memory locations and a destination address of where to copy the contents of the first block of memory locations if the name of the operation is a copy operation; and a length field to store a size of the first block of memory locations.

14. The memory controller of claim 11, wherein the first register file comprises:
an operation field to store a name of an operation to be performed by the first resource unit; and
an address field to store a starting address and an ending address of the first block of memory locations and a destination address of where to copy the contents of the first block of memory locations if the name of the operation is a copy operation.

15. The memory controller of claim 11, further comprising:
a second register file comprising fields to store information that defines a second block of memory locations in the memory and indicates whether the second block of memory locations is to be cleared or whether contents of the second block of memory locations are to be copied to a second destination; and
a second resource unit, coupled to the second register file and the first resource unit, to clear the second block of memory locations or to copy the contents of the second block of memory locations to the second destination as indicated by the second register file simultaneously as the first resource unit clears the first block of memory locations or copies the contents of the first block of memory locations.

16. A computer system, comprising:
a first bus;
a processor coupled to the first bus;
a memory;
a second bus; and
a bridge memory controller, coupled to the first bus, the memory, and the second bus, comprising:
a first register file comprising fields to store information that defines a first block of memory locations in the memory and indicates whether the first block of memory locations is to be cleared or whether contents of the first block of memory locations are to be copied to a first destination, and
a first resource unit to clear the first block of memory locations or copy the contents of the first block of memory locations to the first destination as indicated by the first register file.

17. The computer system of claim 16, wherein the bridge memory controller further comprises an index register to store an indicator that indicates whether the first resource unit is available.

18. The computer system of claim 16, wherein the first register file comprises:
an operation field to store a name of an operation to be performed by the first resource unit;
an address field to store a starting address of the first block of memory locations and a destination address of where to copy the contents of the first block of memory locations if the name of the operation is a copy operation; and
a length field to store a size of the first block of memory locations.

19. The computer system of claim 16, wherein the first register file comprises:
an operation field to store a name of an operation to be performed by the first resource unit; and
an address field to store a starting address and an ending address of the first block of memory locations and a destination address of where to copy the contents of the first block of memory locations if the name of the operation is a copy operation.

20. The computer system of claim 16, wherein the bridge memory controller further comprises:
a second register file comprising fields to store information that defines a second block of memory locations in the memory and indicates whether the second block of memory locations is to be cleared or whether contents of the second block of memory locations are to be copied to a second destination; and
a second resource unit that clears the second block of memory locations or copies the contents of the second block of memory locations to the second destination as indicated by the second register file simultaneously as the first resource unit clears the first block of memory locations or copies the contents of the first block of memory locations.

21. A method for clearing and copying a block of memory locations in a memory, comprising:
storing, in an operation field in a register file of a bridge memory controller, a name of an operation to be performed on the block of memory locations in the memory;
storing, in a starting address field in the register file of the bridge memory controller, a starting address of the block of memory locations;

storing, in a destination address field in the register file of the bridge memory controller, a destination address of where the block of memory locations is to be copied if the name of the operation to be performed is a copy operation;

reading data from the block of memory locations and copying the data to the destination address if the name of the operation to be performed is the copy operation; and invalidating cache data in a processor, the cache data corresponding to the block of memory locations, and writing zeros into the block of memory locations if the name of the operation to be performed is a clear operation.

22. The method of claim 21, wherein a resource unit of the bridge memory controller performs at least one of reading of and copying of the data, and invalidating of the cache data and writing of the zeros, the method further comprising storing an indicator in an index register of the bridge memory controller that indicates whether the resource unit is available.

23. The method of claim 21, wherein reading of the data from the block of memory is achieved by a resource unit of the bridge memory controller by issuing a Read For Ownership command.

24. The method of claim 21, wherein invalidating of the cache data in the processor is achieved by a resource unit of the bridge memory controller by issuing a Memory Invalidate command.

* * * * *